United States Patent
Candelore (10) Patent No.: US 7,120,250 B2
(45) Date of Patent: Oct. 10, 2006

(54) CONTENT DISTRIBUTION FOR MULTIPLE DIGITAL RIGHTS MANAGEMENT

(75) Inventor: Brant L. Candelore, Escondido, CA (US)

(73) Assignees: Sony Corporation, Toyko (JP); Sony Electronics Inc., Park Ridge, NJ (US)

( * ) Notice: Subject to any disclaimer, the term of this patent is extended or adjusted under 35 U.S.C. 154(b) by 221 days.

(21) Appl. No.: 10/318,782

(22) Filed: Dec. 13, 2002

(65) Prior Publication Data

US 2004/0049694 A1    Mar. 11, 2004

Related U.S. Application Data

(60) Provisional application No. 60/409,675, filed on Sep. 9, 2002.

(51) Int. Cl.
*H04N 7/167* (2006.01)

(52) U.S. Cl. .......... 380/200; 380/281; 380/284; 380/201; 380/217; 725/31

(58) Field of Classification Search ........... 713/200, 713/168; 380/23, 21, 281, 284, 200–201; 726/3; 705/52; 358/1.15; 725/31
See application file for complete search history.

(56) References Cited

U.S. PATENT DOCUMENTS

| | | |
|---|---|---|
| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,722,003 A | 1/1988 | Kondo |
| 4,739,510 A | 4/1988 | Jeffers et al. |
| 4,772,947 A | 9/1988 | Kono |
| 4,785,361 A | 11/1988 | Brotby |

(Continued)

FOREIGN PATENT DOCUMENTS

EP    0471373    2/1992

(Continued)

OTHER PUBLICATIONS

"A Report on Security Issues in Multimedia" by Gulwani, pp. 10-14, Apr. 30, 2000, Course Notes, Department of Computer Science and Engineering, Indian Institute of Technology Kanpur.

(Continued)

*Primary Examiner*—Hosuk Song
*Assistant Examiner*—T. B. Truong
(74) *Attorney, Agent, or Firm*—Miller Patent Services; Jerry A. Miller (57) ABSTRACT

A method and apparatus for enabling use of multiple digital rights management scenarios (DRM). Unencrypted data representing digital content is examined to identify at least segments of content for encryption. The identified segments of content are duplicated and then encrypted using a first encryption method associated with a first DRM to produce first encrypted segments. Duplicates are encrypted using a second encryption method associated with a second DRM to produce second encrypted segments. A set of pointers are generated that point to the first and second encrypted segments content. A file is then created containing first and second encrypted segments of content, pointers and unencrypted content along with DRM rights data to produce a selectively encrypted multiple DRM enabled file.

38 Claims, 6 Drawing Sheets

U.S. PATENT DOCUMENTS

| | | |
|---|---|---|
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. |
| 4,953,023 A | 8/1990 | Kondo |
| 4,995,080 A | 2/1991 | Bestler et al. |
| 5,018,197 A | 5/1991 | Jones et al. |
| 5,023,710 A | 6/1991 | Kondo et al. |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,241,381 A | 8/1993 | Kondo |
| 5,247,575 A | 9/1993 | Sprague et al. |
| 5,258,835 A | 11/1993 | Kato |
| 5,319,712 A | 6/1994 | Finkelstein et al. |
| 5,325,432 A | 6/1994 | Gardeck et al. |
| 5,327,502 A | 7/1994 | Katata |
| 5,359,694 A | 10/1994 | Concordel |
| 5,379,072 A | 1/1995 | Kondo |
| 5,398,078 A | 3/1995 | Masuda et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,455,862 A * | 10/1995 | Hoskinson .................. 380/262 |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,703,889 A | 12/1997 | Shimoda et al. |
| 5,717,814 A | 2/1998 | Abecassis |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,922,048 A | 7/1999 | Emura |
| 5,933,500 A | 8/1999 | Blatter et al. |
| 5,933,501 A | 8/1999 | Leppek |
| 5,940,738 A | 8/1999 | Rao |
| 5,949,877 A | 9/1999 | Traw et al. |
| 5,949,881 A | 9/1999 | Davis |
| 5,973,679 A | 10/1999 | Abbott et al. |
| 5,973,722 A | 10/1999 | Wakai et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,021,199 A | 2/2000 | Ishibashi |
| 6,021,201 A | 2/2000 | Bakhle et al. |
| 6,028,932 A | 2/2000 | Park |
| 6,049,613 A | 4/2000 | Jakobsson |
| 6,055,314 A | 4/2000 | Spies et al. |
| 6,057,872 A | 5/2000 | Candelore |
| 6,058,186 A | 5/2000 | Enari |
| 6,058,192 A | 5/2000 | Guralnick et al. |
| 6,061,451 A | 5/2000 | Muratani et al. |
| 6,064,748 A | 5/2000 | Hogan |
| 6,065,050 A | 5/2000 | DeMoney |
| 6,069,647 A | 5/2000 | Sullivan et al. |
| 6,070,245 A | 5/2000 | Murphy, Jr. et al. |
| 6,072,873 A | 6/2000 | Bewick |
| 6,073,122 A | 6/2000 | Wool |
| 6,088,450 A | 7/2000 | Davis et al. |
| 6,105,134 A | 8/2000 | Pinder et al. |
| 6,118,873 A | 9/2000 | Lotspiech et al. |
| 6,134,551 A | 10/2000 | Aucsmith |
| 6,138,237 A * | 10/2000 | Ruben et al. ................ 713/200 |
| 6,148,082 A | 11/2000 | Slattery et al. |
| 6,154,206 A | 11/2000 | Ludtke |
| 6,157,719 A | 12/2000 | Wasilewski et al. |
| 6,181,334 B1 | 1/2001 | Freeman et al. |
| 6,185,369 B1 | 2/2001 | Ko et al. |
| 6,185,546 B1 | 2/2001 | Davis |
| 6,189,096 B1 | 2/2001 | Haverty |
| 6,192,131 B1 | 2/2001 | Geer et al. |
| 6,199,053 B1 | 3/2001 | Herbert et al. |
| 6,204,843 B1 | 3/2001 | Freeman et al. |
| 6,209,098 B1 | 3/2001 | Davis |
| 6,215,484 B1 | 4/2001 | Freeman et al. |
| 6,226,618 B1 | 5/2001 | Downs |
| 6,229,895 B1 | 5/2001 | Son et al. |
| 6,230,194 B1 | 5/2001 | Frailong et al. |
| 6,230,266 B1 | 5/2001 | Perlman et al. |
| 6,240,553 B1 | 5/2001 | Son et al. |
| 6,246,720 B1 | 6/2001 | Kutner et al. |

| | | |
|---|---|---|
| 6,256,747 B1 | 7/2001 | Inohara et al. |
| 6,263,506 B1 | 7/2001 | Ezaki et al. |
| 6,266,416 B1 | 7/2001 | Sigbjornsen et al. |
| 6,266,480 B1 | 7/2001 | Ezaki et al. |
| 6,272,538 B1 | 8/2001 | Holden et al. |
| 6,278,783 B1 | 8/2001 | Kocher et al. |
| 6,289,455 B1 | 9/2001 | Kocher et al. |
| 6,292,568 B1 | 9/2001 | Akins, III et al. |
| 6,292,892 B1 | 9/2001 | Davis |
| 6,307,939 B1 | 10/2001 | Vigarie |
| 6,311,012 B1 | 10/2001 | Cho et al. |
| 6,351,538 B1 | 2/2002 | Uz |
| 6,378,130 B1 | 4/2002 | Adams |
| 6,389,533 B1 | 5/2002 | Davis et al. |
| 6,389,537 B1 | 5/2002 | Davis et al. |
| 6,415,031 B1 | 7/2002 | Colligan et al. |
| 6,415,101 B1 | 7/2002 | deCarmo et al. |
| 6,430,361 B1 | 8/2002 | Lee |
| 6,449,718 B1 | 9/2002 | Rucklidge et al. |
| 6,456,985 B1 | 9/2002 | Ohtsuka |
| 6,459,427 B1 | 10/2002 | Mao et al. |
| 6,463,152 B1 | 10/2002 | Takahashi |
| 6,466,671 B1 | 10/2002 | Maillard et al. |
| 6,505,032 B1 | 1/2003 | McCorkle et al. |
| 6,505,299 B1 | 1/2003 | Zeng et al. |
| 6,510,554 B1 | 1/2003 | Gordon et al. |
| 6,519,693 B1 | 2/2003 | Debey |
| 6,529,526 B1 | 3/2003 | Schneidewend |
| 6,543,053 B1 | 4/2003 | Li et al. |
| 6,549,229 B1 | 4/2003 | Kirby et al. |
| 6,557,031 B1 | 4/2003 | Mimura et al. |
| 6,587,561 B1 | 7/2003 | Sered et al. |
| 6,640,145 B1 | 10/2003 | Hoffberg et al. |
| 6,654,389 B1 | 11/2003 | Brunheroto et al. |
| 6,678,740 B1 | 1/2004 | Rakib et al. |
| 6,681,326 B1 | 1/2004 | Son et al. |
| 6,684,250 B1 | 1/2004 | Anderson et al. |
| 6,697,944 B1 * | 2/2004 | Jones et al. ............ 713/168 |
| 6,772,340 B1 * | 8/2004 | Peinado et al. .......... 713/168 |
| 6,788,690 B1 | 9/2004 | Harri |
| 6,826,185 B1 | 11/2004 | Montanaro et al. |
| 6,891,565 B1 | 5/2005 | Dieterich |
| 6,904,520 B1 | 6/2005 | Rosset et al. |
| 6,976,166 B1 | 12/2005 | Herley et al. |
| 2001/0030959 A1 | 10/2001 | Ozawa et al. |
| 2002/0046406 A1 | 4/2002 | Chelehmal et al. |
| 2002/0059425 A1 | 5/2002 | Belfiore et al. |
| 2002/0083317 A1 | 6/2002 | Ohta et al. |
| 2002/0083438 A1 | 6/2002 | So et al. |
| 2002/0108035 A1 | 8/2002 | Herley et al. |
| 2002/0129243 A1 | 9/2002 | Nanjundiah |
| 2002/0150239 A1 | 10/2002 | Camy et al. |
| 2002/0170053 A1 | 11/2002 | Peterka et al. |
| 2002/0194613 A1 | 12/2002 | Unger |
| 2002/0196939 A1 | 12/2002 | Unger et al. |
| 2003/0002854 A1 | 1/2003 | Belknap et al. |
| 2003/0021412 A1 | 1/2003 | Cadelore et al. |
| 2003/0026423 A1 | 2/2003 | Unger et al. |
| 2003/0046686 A1 | 3/2003 | Candelore et al. |
| 2003/0063615 A1 | 4/2003 | Luoma et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0188154 A1 | 10/2003 | Dallard |
| 2003/0193973 A1 | 10/2003 | Takashimizu et al. |
| 2003/0198223 A1 | 10/2003 | Mack et al. |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0028227 A1 | 2/2004 | Yu |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0078575 A1 | 4/2004 | Morten et al. |
| 2004/0081333 A1 | 4/2004 | Grab et al. |
| 2004/0091109 A1 | 5/2004 | Son et al. |
| 2004/0123094 A1 | 6/2004 | Sprunk |
| 2004/0139337 A1 | 7/2004 | Pinder et al. |
| 2004/0165586 A1 | 8/2004 | Read et al. |
| 2004/0187161 A1 | 9/2004 | Cao |
| 2004/0193550 A1 | 9/2004 | Siegal |
| 2005/0004875 A1 * | 1/2005 | Kontio et al. ............ 705/52 |
| 2005/0071669 A1 | 3/2005 | Medvinsky et al. |
| 2005/0169473 A1 | 8/2005 | Candelore |
| 2005/0192904 A1 | 9/2005 | Candelore |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1 187 483 A2 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/78386 A2 | 10/2001 |

OTHER PUBLICATIONS

"Ad Agencies and Advertisers To Be Empowered with Targeted Ads Delivered by Television's Prevailing Video Servers" Article Business Section of The New York Times, Updated Thursday, Dec. 20, 2001.

"An Efficient MPEG Video Encryption Algorithm" by Shi and Bhargava, pp. 381-386, 1998 IEEE.

"An Empirical Study of Secure MPEG Video Transmissions" by Agi and Gong, pp. 137-144, 1996, IEEE, Proceedings of SNDSS '96.

"Applying Encryption to Video Communication" by Kunkelmann, pp. 41-47, Sep. 1998, Multimedia and Security Workshop at ACM Multimedia '98. Bristol, U.K.

"Comparison of MPEG Encryption Algorithms" by Qiao and Nahrstedt, Jan. 17, 1998, Preprint submitted to Elsevier Science.

"Coral Consortium Aims to Make DRM Interoperable", by Bill Rosenblatt, Oct. 7, 2004, online at http://www.drmwatch.com/standards/article.php/3418741.

"DVD Demystified—The Guidebook for DVD-Video and DVD-ROM" by Jim Taylor, Pub. McGraw-Hill, 1998, ISBN: 0-07-064841-7, pp. 134-147.

"Dynamic-Customized TV Advertising Creation and Production Tools" by SeaChange International, Web Site Literature.

"Efficient Frequency Domain Video Scrambling for Content Access Control" by Zeng and Lei, Nov. 1999, In Proc. ACM Multimedia.

"Evaluation of Selective Encryption Techniques for Secure Transmission of MPEG-Compressed Bit-Streams" by Alattar and Al-Regib, pp. IV-340 to IV-343, 1999, IEEE.

"Fast Encryption Methods for Audiovisual Data Confidentiality" by Wu and Kuo, Nov. 2000, SPIE International Symposia on Information Technologies 2000, (Boston, Ma., USA).

"Improved Selective Encryption Techniques for Secure Transmission of MPEG Video Bit-Streams" by Alattar, Al-Regib and Al-Semari, pp. 256-260, 1999, IEEE.

Metro Media™ PVR-DVD-MP3-Web—Internet Publication from www.metrolink.com, undated.

"Multimedia and Security Workshop at ACM Multimedia" '98. Bristol, U.K., Sep. 1998.

"Passage™, Freedom to Choose", 2003 Sony Electronics Inc.

"Performance Study of a Selective Encryption Scheme for the Security of Networked, Real-Time Video" by Spanos and Maples, pp. 2-10, 1995, IEEE.

"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"Selective Encryption and Watermarking of MPEG Video (Extended Abstract)" by Wu and Wu, Feb. 17, 1997, submitted to International Conference on Image Science, Systems, and Technology, CISST'97.

"The Long March to Interoperable Digital Rights Management" by Koenen et al., pp. 1-17, 2004, IEEE.

"Transport Streams Insertion of Video in the Compressed Digital Domain" by SeaChange International, Web Site Literature, 2000.

"Visible World—A High Impact Approach to Customized Television Advertising" by Haberman, Dec. 2001.

ANONYMOUS, Message Authentication with Partial Encryption, Research disclosure RD 296086, Dec. 10, 1988.

McCormac Hack Over Cablemodem, HackWatchAug. 10, 1998.

ANONYMOUS, New Digital Copy Protection Proposal Would Secure Authorized Copies, PR Newswire, Nov. 1998, pp. 1-3.

Aravind, H. , et al., "Image and Video Coding Standards", AT&T Technical Journal, (Jan./Feb. 1993),67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

Lookabaugh et al., "Selective Encryption and MPEG-2", ACM Multimedia '03, Nov. 2003.

Lakshiminath, et al., "A Dual Protocol for Scalable Secure Multicasting", 1999 International Symposium on Computers and Communication, Jul. 6-8, 1999.

ANONYMOUS, New Digital Copy Protection Proposal Would Secure Authorized Copies, PR Newswire, Nov. 1998, pp. 1-3.

ANONYMOUS, Message Authentication with Partial Encryption, Research disclosure RD 296086, Dec. 10, 1988.

"Performance Study of a Selective Encryption Scheme for the Security of Networked, Real-Time Video" by Spanos and Maples, pp. 2-10, 1995, IEEE.

"An Empirical Study of Secure MPEG Video Transmissions" by Agi and Gong, pp. 137-144, 1996, IEEE, Proceedings of SNDSS '96.

"Selective Encryption and Watermarking of MPEG Video (Extended Abstract)" by Wu and Wu, Feb. 17, 1997, submitted to International Conference on Image Science, Systems and Technology, CISST'97.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"DVD Demystified—The Guidebook for DVD-Video and DVD-ROM" by Jim Taylor, Pub. McGraw-Hill, 1998, ISBN: 0-07-064841-7, pp. 134-147.

"An Efficient MPEG Video Encryption Algorithm" by Shi and Bhargava, pp. 381-386, 1998 IEEE.

"Multimedia and Security Workshop at ACM Multimedia" '98. Bristol, U.K., Sep. 1998.

"Comparison of MPEG Encryption Algorithms" by Qiao and Naharstedt, Jan. 17, 1998, Preprint submitted to Elsevier Science.

"Applying Encryption to Video Communication" by Kunkelmann, pp. 41-47, Sep. 1998, Multimedia and Security Workshop at ACM Multimedia '98. Bristol, U.K.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Transport Streams Insertion of Video in the Compressed Digital Domain" by SeaChange International, Web Site Literature, 2000.

"A Report on Security Issues in Multimedia" by Gulwani, Apr. 30, 2000, Course Notes, Department of Computer Science and Engineering, Indian Institute of Technology Kanpur.

"Fast Encryption Methods for Audiovisual Data Confidentiality" Wu and Kuo, Nov. 2000, SPIE International Symposia on Information Technologies 2000, (Boston, Ma., USA).

"Visible World—A High Impact Approach to Customized Television Advertising" by Haberman, Dec. 2001.

"Ad Agencies and Advertisers To Be Empowered with Targeted Ads Delivered by Television's Prevailing Video Servers" Article Business Section of The New York Times, Updated Thursday, Dec. 20, 2001.

"Pre-Encryption Profiles—Concept Overview and Proposal", Rev. 1.2 as submitted to the Open CAS consortium on Dec. 28, 2000.

"Dynamic-Customized TV Advertising Creation and Production Tools" by SeaChange International, Web Site Literature.

Alattar, A.M. et al., Improved selective encryption techniques for secure transmission of MPEG video bitstreams, Oct. 24, 1999, Digimarc Corp., Lake Oswego, OR, USA, IEEEE, pp. 256-260.

Yip, Kun-Wah, Partial-encryption technique for intellectual property protection of FPGA-Based products, Dec. 15, 1999, IEEE, pp. 183-190.

Kunkelmann T. et al., A scalable security architecture for multimedia communication standards, Darmstard Univ. of Technology, ITO, Germany, 1997, pp. 660-661.

International Search Report for application No. PCT/US2004/032228.

Liu, et al. Motion Vector Encryption in Multimedia Streaming. 2004, IEEE, pp. 64-71.

* cited by examiner

CONTENT DISTRIBUTION FOR MULTIPLE DIGITAL RIGHTS MANAGEMENT

CROSS REFERENCE TO RELATED DOCUMENTS

This application is related to and claims priority benefit of U.S. Provisional patent application Ser. No. 60/409,675, filed Sep. 9, 2002, entitled "Generic PID Remapping for Content Replacement", to Candelore. These applications are also hereby incorporated by reference herein.

This application is related to patent applications entitled "Critical Packet Partial Encryption" to Unger et al., Ser. No. 10/038,217; patent applications entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and entitled "Decoding and Decrypting of Partially Encrypted Information" to Unger et al., Ser. No. 10/037,498 all of which were filed on Jan. 2, 2002 and are hereby incorporated by reference herein.

This application is also related to U.S. patent application Ser. No. 10/273,905, filed Oct. 18, 2002 to Candelore et al. entitled "Video Slice and Active Region Based Dual Partial Encryption", Ser. No. 10/273,903, filed Oct. 18, 2002 to Candelore et al. entitled "Star Pattern Partial Encryption", Ser. No. 10/274,084, filed Oct. 18, 2002 to Candelore et al. entitled "Slice Mask and Moat Pattern Partial Encryption", and Ser. No. 10/274,019, filed Oct. 18, 2002 to Candelore et al. entitled "Video Scene Change Detection", which are hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of digital rights management. More particularly, this invention relates to a multiple encryption method and apparatus particularly useful for multiple encrypting digitized video for purposes of enabling multiple digital rights management scenarios (DRMs).

BACKGROUND OF THE INVENTION

In traditional distribution of audio and/or video content such as music and movies, rights to copyrighted works are managed by the ownership of the physical medium containing the work. Ownership of the medium provides a limited barrier to unauthorized use. While piracy was and is prevalent with such traditional "packaged media", the problems are dramatically multiplied in an environment of digital distribution of content. The owners of the content have devised various ways to help protect such content that have been collectively termed digital rights management (DRM). DRM encompasses not only the numerous encryption schemes that have been employed to protect the content, but also encompasses the various arrangements for permitting use of the content that have been created, as well as the monitoring and tracking of the rights to the content.

Several forms of DRM are currently in place in the marketplace. Perhaps the most dominant DRM forms a part of the Microsoft Windows® operating system's Media Player, and is referred to as "Reciprocal". Another widely used DRM arrangement is built into the Real Networks' Real Player®. Currently the DRM solutions from Microsoft is tightly coupled with the compression algorithm. DRM solutions usually execute on personal computer (PC) platforms. Consequently, the DRM solutions are designed to detect software tampering, and thus efforts are made to obfuscate the operation of the executing software.

The above two examples of DRM are but two of an ever growing and evolving field of technology. Further DRM incarnations can be anticipated on a continuing basis to provide greater protection for the content against those who would illegally pirate the content.

Unfortunately, due to the multiple types of DRM that are available, customers may have to either acquire multiple sets of software (or plug-ins) that support the various DRM scenarios, or limit consumption of content to those DRMs which they wish to support on their computer.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. The term "video" is often used herein to embrace not only true visual information, but also in the conversational sense (e.g., "video tape recorder") to embrace not only video signals but associated audio and data. The present document generally uses the example of a "dual selective encryption" embodiment, but those skilled in the art will recognize that the present invention can be utilized to realize multiple partial encryption without departing from the invention. The terms "partial encryption" and "selective encryption" are used synonymously herein.

The above-referenced commonly owned patent applications describe inventions relating to various aspects of methods generally referred to herein as partial encryption or selective encryption. More particularly, systems are described wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

The present invention applies similar selective encryption techniques to the problem of multiple digital rights management. The partial encryption processes described in the above patent applications utilize any suitable encryption method. However, these encryption techniques are selectively applied to the data stream, rather than encrypting the entire data stream, using techniques described in the above-referenced patent applications. In general, but without the intent to be limiting, the selective encryption process utilizes intelligent selection of information to encrypt so that the entire program does not have to undergo dual encryption. By appropriate selection of data to encrypt, the program material can be effectively scrambled and hidden from those who desire to hack into the system and illegally recover commercial content without paying. MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data. Thus, encryption of this anchor data, for example, or other key data can effectively render the video un-viewable.

Certain embodiments of the present invention enable a second (or multiple) Digital Rights Management (DRM) solution by duplicating and encrypting content important or critical for decoding the rest of the content with the first and second DRMs. The duplication of content need not add a major increase bandwidth overhead. Unlike terrestrial and satellite broadcast streams, content delivered and eventually decrypted by a PC over the internet does not have to be restricted to 188 byte packets. For terrestrial and satellite streams, hardware decryption is usually performed on per packet basis based on the scrambling bits in the transport header. Content decryption done in software can be much more granular and selective.

In accordance with certain embodiments consistent with the present invention, the selected video data to be encrypted may be any individual one or combination of the following (described in greater detail in the above applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra-coded macroblock, data for a slice containing an intra-coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) can be utilized with the present invention to encrypt only a portion of the content.

Figure 1:
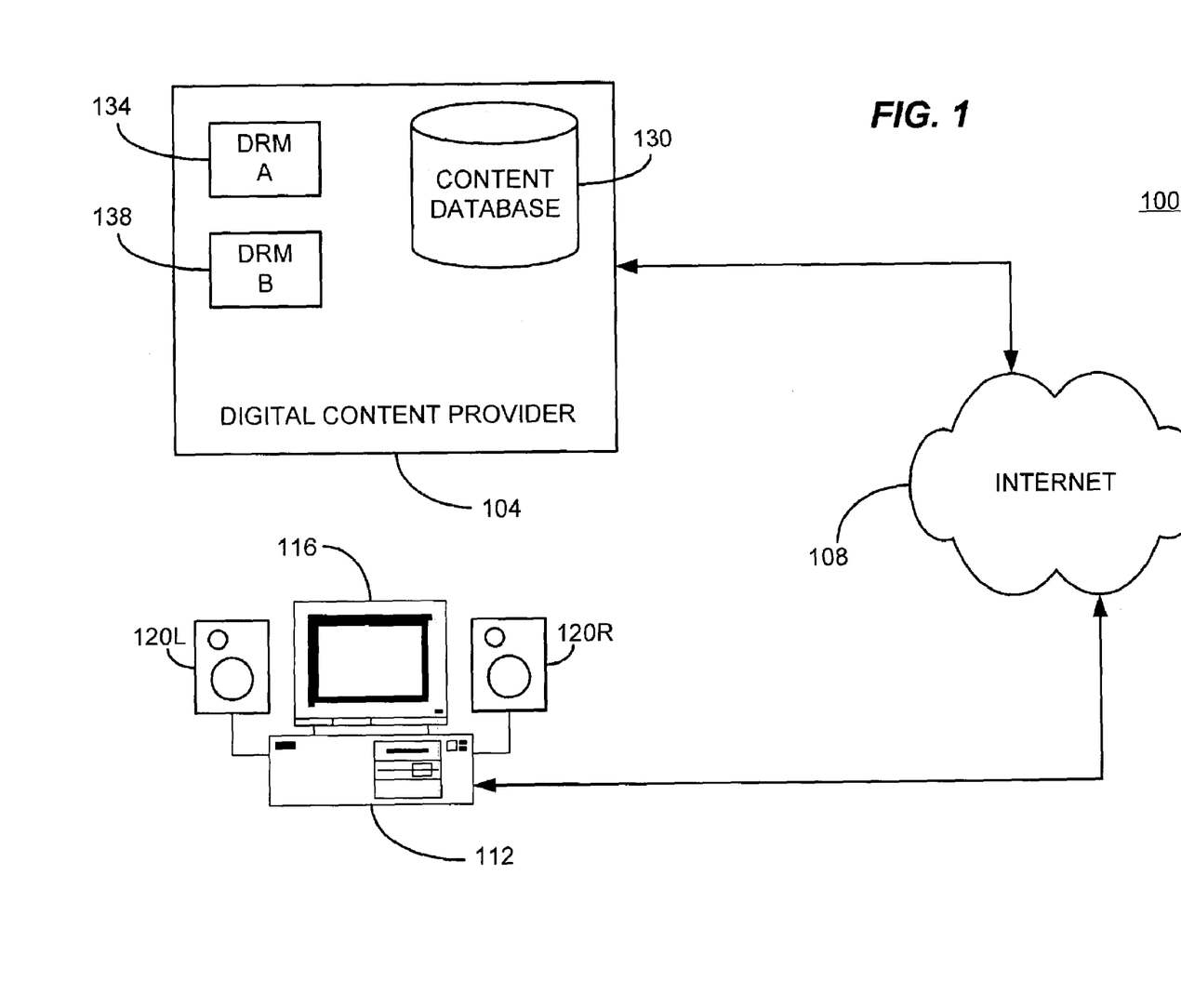
FIG. 1 is a block diagram of an digital content distribution system including digital rights management consistent with certain embodiments of the present invention.

Referring now to FIG. 1, a content delivery system 100 consistent with certain embodiments of the present invention is illustrated. In this system, a digital content provider 104 provides content such as audio or video content to a customer over the Internet for delivery to the customer's personal computer system 112, e.g., by downloading or streaming. Computer system 112 may, for example, be a multimedia computer system having a video display 116 and a stereo (or other multi-channel) audio system that drives a set of speakers such as speakers 120L and 120R. The personal computer 112 operates using any suitable operating system and incorporates one or more software programs for playback of the audio and/or video content (hereinafter, a "media player").

The digital content provider may operate as an addressable web site that serves as an online distributor of content. In this example, the web site is shown to have a content database 130 that stores content which can be purchased under various terms by customers having computers such as 112 connected to the Internet. To provide a simplified example, without intent to limit the scope of the present invention, digital content provider 104 is depicted as having the ability to supply content using two digital rights management systems—DRM A shown as 134 and DRM B shown as 138. In a conventional digital content provider scenario, only a single DRM system is used and content is stored in encrypted form using the encryption scenario for that particular DRM system.

In accordance with certain embodiments consistent with the present invention, content stored in the content database 130 is stored with dual (in general multiple) selective encryption consistent with the content provider's dual (multiple) DRMs. In this manner, the digital content provider 104 is not burdened with the requirement and cost associated with storage of the content separately under multiple DRMs. Nor is the computing power required to dynamically encrypt the content using a specified DRM at the time of purchase.

Figure 2:
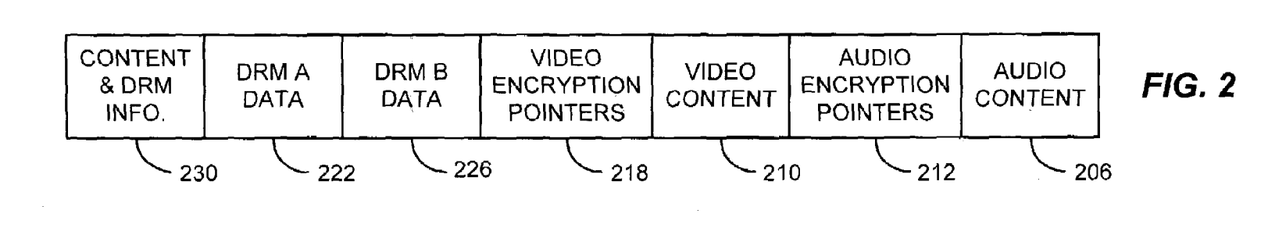
FIG. 2 illustrates an exemplary file structure consistent with certain embodiments of the present invention.

Content can be arranged for delivery to the customer as a file similar to that depicted in FIG. 2. In this file structure, the file delivered to the customer is stored with selected portions multiply encrypted. In one example, not intended to be limiting, if the content is stored as MPEG data, one can encrypt all of the MPEG I frames or video slice headers to achieve a substantial level of encryption without need to encrypt the entire file. Any other suitable selective encryption arrangement can also be used without limitation. Once a selected portion of the audio and/or video is selected for encryption, the selected portions are duplicated and encrypted. In this example, the selected portions are encrypted under an encryption arrangement consistent with DRM A in one case and consistent with DRM B in the other. The content is then reassembled with the duplicated encrypted content replacing the original clear content. (Note that in other scenarios, content can be stored encrypted or unencrypted and the file processed and constructed for delivery to the customer "on the fly".)

In this example of Audio/Video content, the content is stored as audio content 206 and video content 210. The file further contains a set of audio encryption pointers 212 that point to the selected portions of the audio content that are encrypted. Similarly, the file further contains a set of video encryption pointers 218 that point to the selected portions of the video content that are encrypted. DRM A data section 222 provides data that the decoder will need to decode the content encrypted using the encryption scheme of DRM A. Similarly, DRM B data section 226 provides data that the decoder will need to decode the content encrypted using the encryption scheme of DRM B. An identification section 230 identifies the content and the DRM schemes available in the file.

Figure 3:
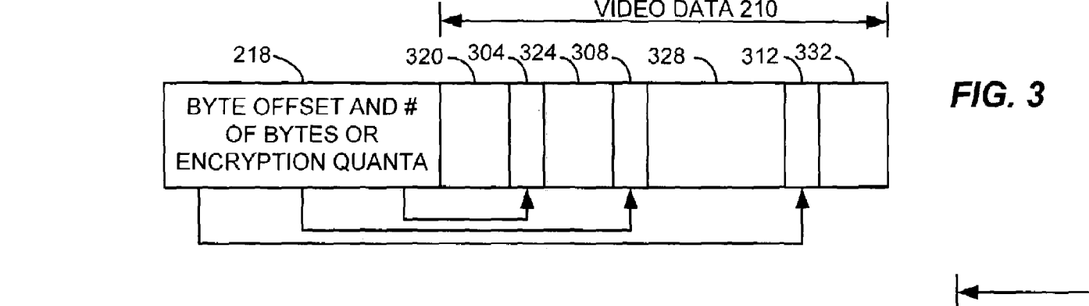
FIG. 3 illustrates a byte offset arrangement for video data consistent with certain embodiments of the present invention.

The relationship between the video data 210 and video encryption pointers 218 is illustrated in FIG. 3. Pointers are stored that point to encrypted portions of the video data in the file. Such encrypted portions are shown as 304, 308 and 312. Such encrypted portions are interspersed with portions of data stored unencrypted (In the clear) shown as 320, 324, 328 and 332. Of course this illustration is quite simplified since only a small number of encrypted segments are shown compared to the likely large number of encrypted segments. In this illustration, each encrypted segment is illustrated to be the same size (i.e., the encryption quanta), but this is not to be interpreted as limiting.

Figure 4:
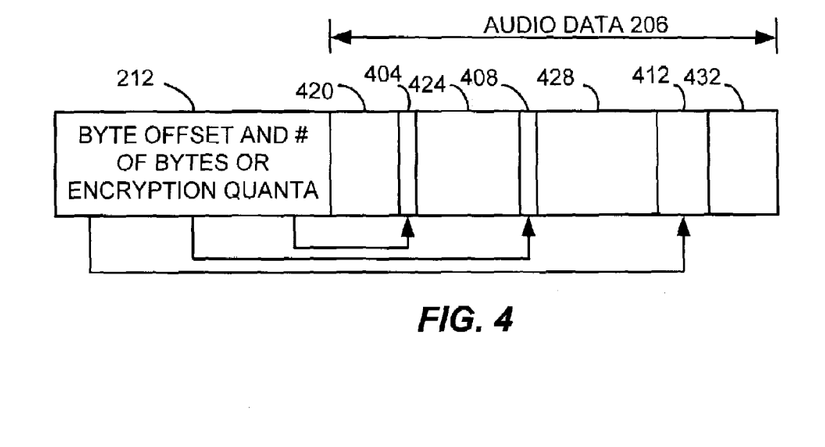
FIG. 4 illustrates a byte offset arrangement for audio data consistent with certain embodiments of the present invention.

The relationship between the audio data 206 and audio encryption pointers 212 is similar and illustrated in FIG. 4. Pointers are stored that point to encrypted portions of the audio data in the file. Such encrypted portions are shown as 404, 408 and 412. Such encrypted portions are interspersed with portions of data stored unencrypted shown as 420, 424, 428 and 432. Again, this illustration is quite simplified since only a small number of encrypted segments are shown compared to the likely large number of encrypted segments. In this illustration, the encrypted segments are shown as differing in size, which can be achieved by specifying the length of each encrypted segment.

In each case, the number of bytes to be encrypted can be predefined if desired as the encryption quanta so that the encryption pointers can be simply a sequence of memory offset locations. The amount of data encrypted is then determined by a preset encryption quanta (e.g., 8 bytes). In other embodiments, the encryption pointer section can include not only a starting offset but also an ending offset or a starting offset and a number of bytes.

Figure 5:
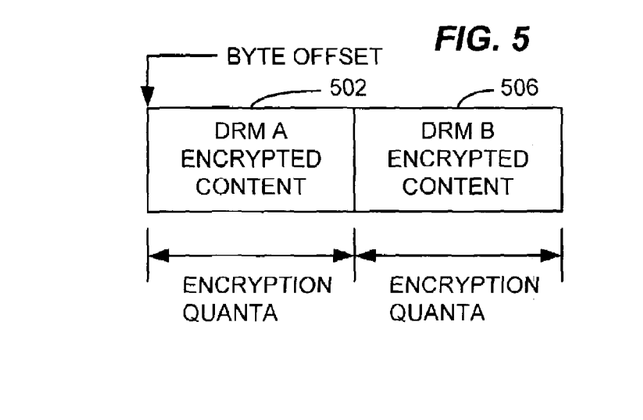
FIG. 5 illustrates an exemplary DRM arrangement within video or audio data content consistent with certain embodiments of the present invention.

FIG. 5 depicts an exemplary section of encrypted content with the byte offset location illustrated at the beginning of the section of encrypted content. The next segment of data is DRM A encrypted content 502 that lasts for a duration determined by the encryption quanta (either predefined or encoded in the encryption pointers). The next segment of encrypted content 506 is encrypted under DMA B's encryption scheme and lasts for a duration again defined by the encryption quanta. By using a predefined encryption quanta, the encryption pointers are simplified. By specifying the size of the encrypted segment, the size can be varied to achieve a more flexible encryption scheme, at the sacrifice of efficiency in the encryption pointers. Note that in the case of a predefined encryption quanta, multiple consecutive segments can be encrypted to achieve the effect of longer segments of encrypted content.

DRMs typically verify that the consumer has paid for viewing the content. Viewing may be granted for a period of time or on a viewing event. When a customer makes a payment, this act enables decryption of the content, often as a result of delivery of a decryption key to the customer to enable decryption. In order to enable two or more DRMs to work side-by-side, there should be a clear separation between the payment and key management operation and the content decryption. The media player should allow selection of either DRM. By use of selective encryption, most of the content can be sent in the clear with only certain critical or important content (needed to decompress the rest of the content) sent encrypted. The critical or important content is duplicated and one set of the content is encrypted under one DRM, while the other, is encrypted under the other DRM.

Movies and music delivered over the Internet can be packetized in UDP packets (User Datagram Protocol packets) for delivery over IP networks. Once re-assembled in the PC, the file can be essentially flat. Both the video and audio can be large packetized elementary stream (PBS) files.

In order to realize certain embodiments of the present invention, there should be agreement as to how a media player identifies content that is encrypted. In certain embodiments, the encryption quanta, if utilized, should be standardized, or there should be agreement on the least common denominator. Granularity of encryption should be standardized (e.g., can bits from different parts of a video and audio frame be collated for encryption? This is more complicated to signal unless the same bits are chosen over-and-over.). These matters, however, are more properly the subject of standardization negotiations and are not important to the understanding of the concepts and principles governing the present invention.

Figure 6:
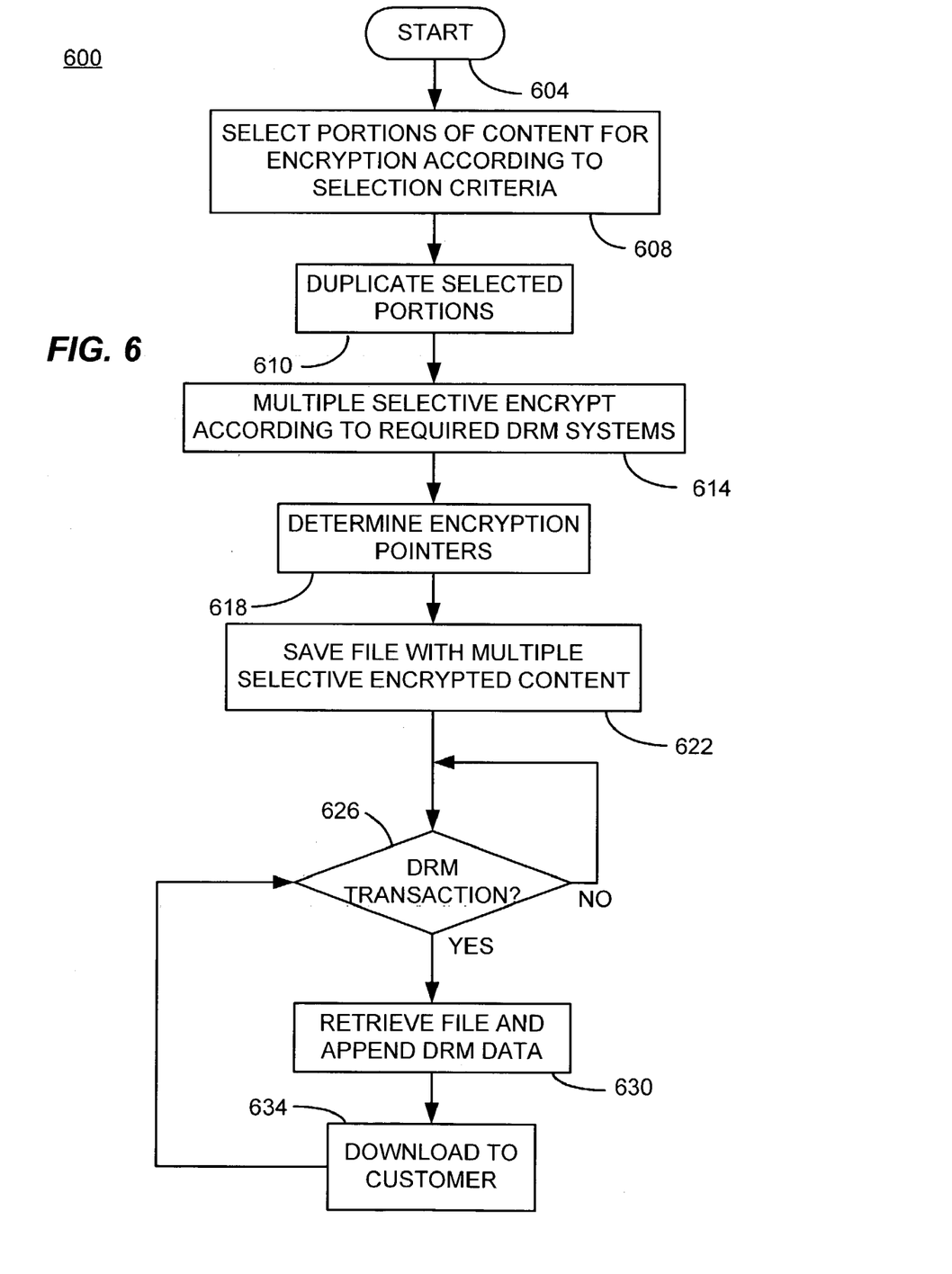
FIG. 6 is a flow chart showing a method for encoding content with multiple DRMs consistent with certain embodiments of the present invention.

The files described above can be created using any of a number of processes. Moreover, the file structure shown, although illustrated for audio/video content, can be readily adapted to audio only by omission of the video encryption pointers and video content. One process for creation of such files is depicted in FIG. 6 as process 600 starting at 604. At 608, a selection criterion is employed to select segments of content to be multiple selectively encrypted. The selection criterion used can be any of those described above, described in the above-referenced patent applications, described elsewhere or newly created without limitation. Once the segments of content are selected, they are duplicated as many times as there are DRM systems to be employed at 610. For example, in the digital content provider 104, one set of duplicate selected data is created.

The selected content is then multiple encrypted such that each of the duplicate sets of selected data is encrypted under the encryption scheme for each of the DRMs at 614. In the example of content provider 104, the selected segments of content are duplicated. One set of selected segments is encrypted under DRM A and the duplicate set is encrypted under DRM B. A set of encryption pointers is then created at 618 as offset values and possibly information that determines the size of the encrypted portions and the file can be saved at 622 in the content database 130 at this point until a customer wishes to acquire digital rights to the content. Alternatively, content can be stored in the clear (or encrypted) and the file for delivery to the customer can be created after purchase by the customer.

When a customer purchases rights to the content, a digital rights managed transaction is carried out at 626 in which the customer pays for certain rights. Such rights might include rights to view for a particular time period or number of viewings. Limitations can be imposed on copying, playback machine or other attributes of the DRM during this transaction. When the transaction is complete, the file containing the purchased content is then retrieved from the content database and DRM data defining the purchased rights is appended at 630. The file is then downloaded or streamed to the customer at 634. The customer can then play back the content (either on computer 112 or another playback device) in a manner consistent with the DRM rights acquired in the transaction at 626.

Thus, a method of enabling use of multiple digital rights management scenarios (DRM), consistent with certain embodiments of the present invention involves examining unencrypted data representing digital content to identify at least segments of content for encryption; encrypting the identified segments of content using a first encryption method associated with a first DRM to produce first encrypted segments; encrypting the identified segments of content using a second encryption method associated with a second DRM to produce second encrypted segments; generating first pointers to the first encrypted content; generating second pointers to the second encrypted content; and replacing the identified segments of content with the first encrypted content and the second encrypted content in the digital content, and inserting the first and second pointers to produce a partially encrypted dual DRM enabled file. When digital rights are purchased, DRM data enabling the rights are appended to the file and the file is sent to the customer.

Figure 7:
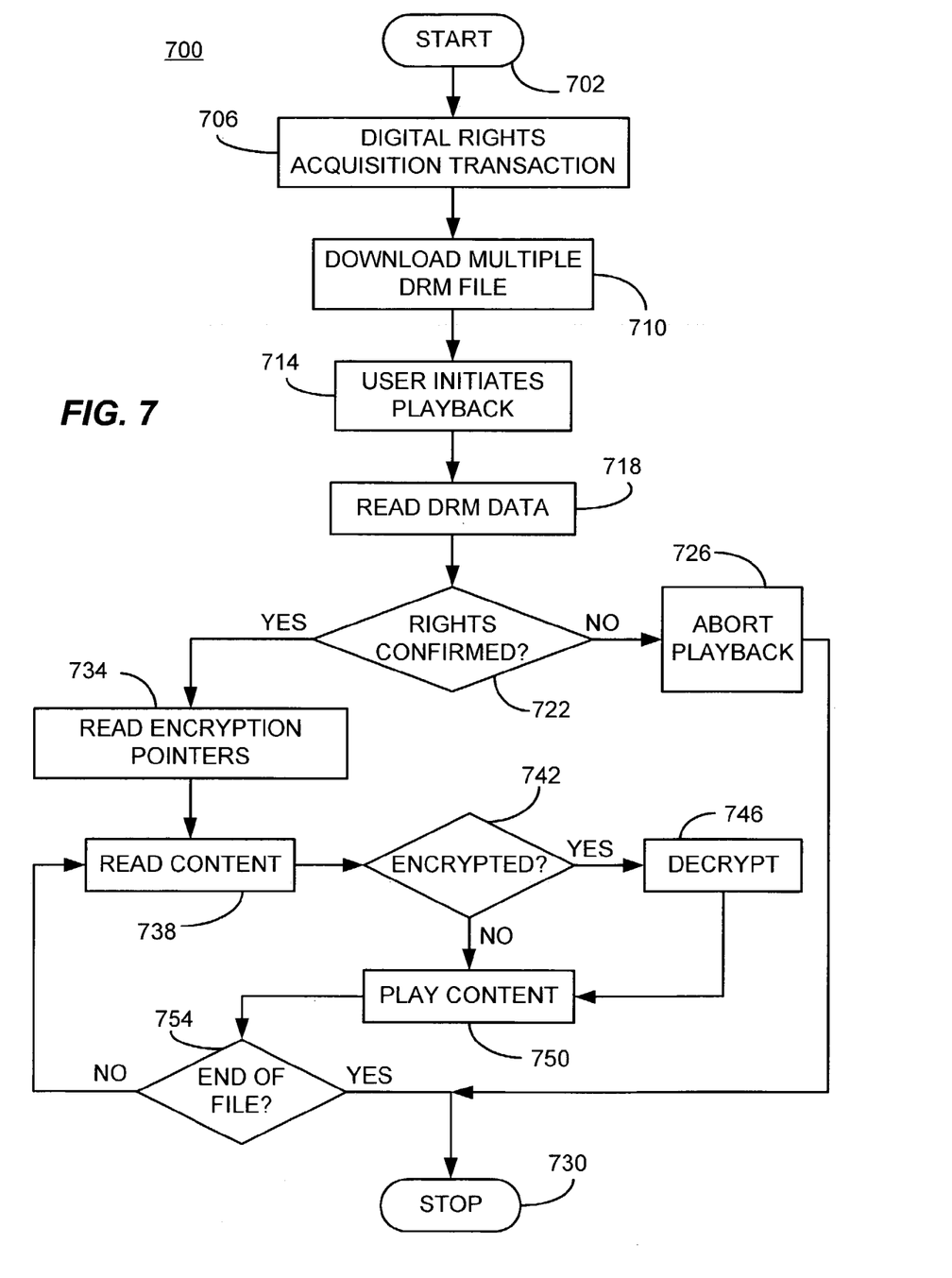
FIG. 7 is a flow chart depicting acquisition and playback of content having multiple DRMs consistent with certain embodiments of the present invention.

A process such as that used by the customer in accordance with certain embodiments consistent with the present invention is illustrated as process 700 of FIG. 7 starting at 702 after which the customer acquires digital rights in content via a digital rights acquisition transaction at 706. The customer can then receive by download or streaming the multiple DRM file at 710. When the customer wishes to initiate playback at 714, the DRM data are read at 718, so that the software on the customer's computer or other playback device can determine if the digital rights acquired by the customer are valid (i.e., not expired or otherwise exhausted). If the software determines that the digital rights have expired or been exhausted at 722, the playback is aborted at 726 and the process ends at 730.

If the customer's digital rights are verified at 722, the software reads the file's encryption pointers at 734 and begins reading the content at 738. If the content is encrypted at 742, it is decrypted at 746 according to the selected DRM scheme being used for playback (dependent upon the playback software and/or playback machine). If the content is unencrypted or decrypted, control passes to 750 where the content is played or buffered for play. If the end of the file has not been reached at 754, control passes back to 738 where a next segment of content is read. When the end of the file is reached at 754, the process stops at 730.

Thus, in accordance with certain embodiments consistent with the present invention, a method of using rights to digital content under one of a plurality of digital rights management scenarios (DRM), involves carrying out a transaction to acquire digital rights to the content; receiving digital content containing: segments of unencrypted content, first encrypted segments of content encrypted using a first encryption method associated with a first DRM, second encrypted segments of content encrypted using a second encryption method associated with a second DRM, first pointers to the first encrypted segments of content; second pointers to the second encrypted segments of content, and DRM data that enables digital rights under at least one of the first DRM and the second DRM; determining that valid digital rights are available from the DRM data; and decrypting one of the first and second encrypted segments to enable playing of the content.

Figure 8:
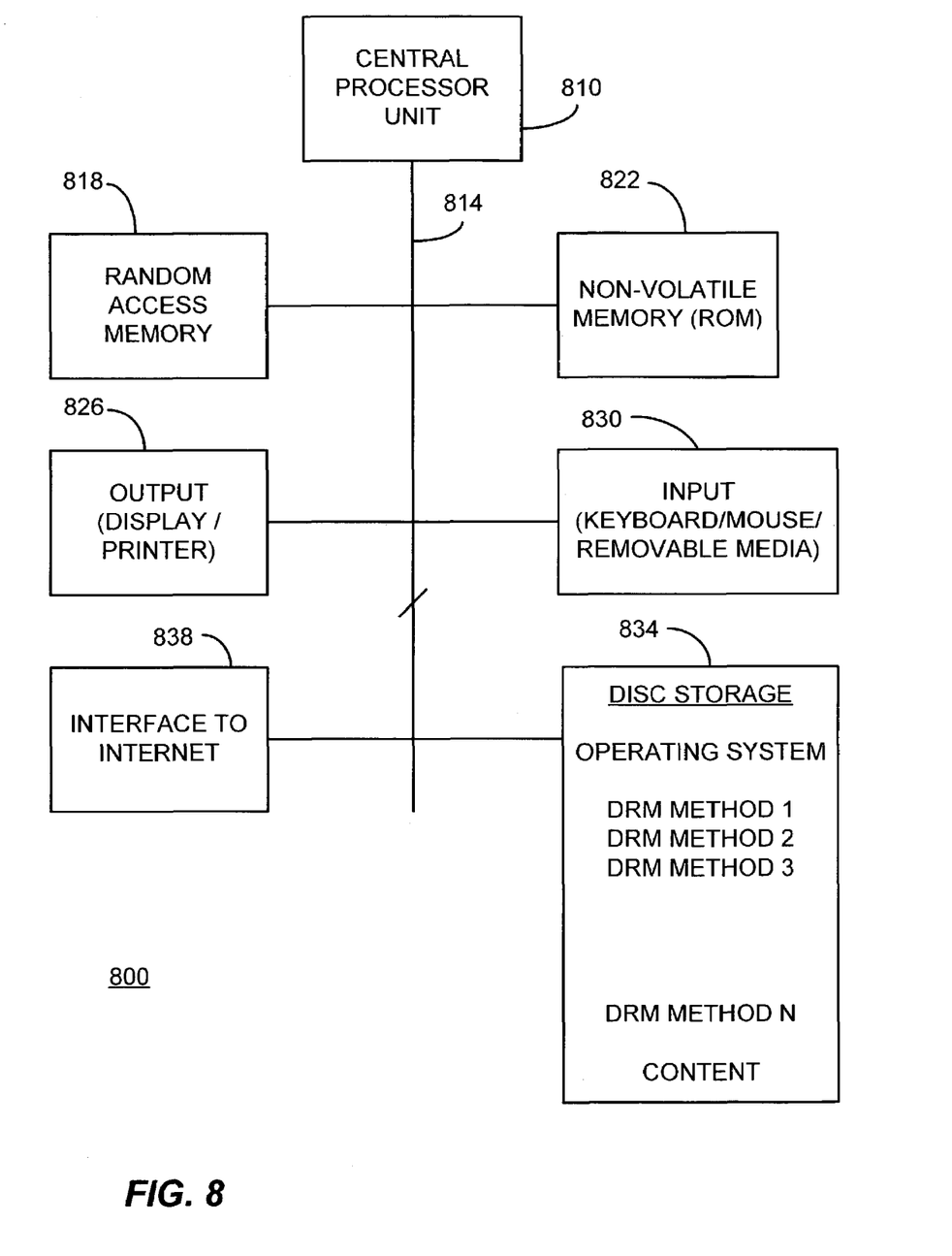
FIG. 8 illustrates a content provider server system consistent with certain embodiments of the present invention.

The process 600 of FIG. 6 can be carried out on any suitable programmed general purpose processor operating as a multiple DRM encoder such as that depicted as computer 800 of FIG. 8. Computer 800 has one or more central processor units (CPU) 810 with one or more associated buses 814 used to connect the central processor unit 810 to Random Access Memory 818 and Non-Volatile Memory 822 in a known manner. Output devices 826, such as a display and printer, are provided in order to display and/or print output for the use of the digital content provider as well as to provide a user interface such as a Graphical User Interface (GUI). Similarly, input devices such as keyboard, mouse and removable media readers 830 may be provided for the input of information by the operator. Computer 800 also incorporates internal and/or external attached disc or other mass storage 834 for storing large amounts of information including, but not limited to, the operating system, multiple DRM encryption methods, as well as the content (which is most likely stored on massive attached storage). The Computer system 800 also has an interface 838 for connection to the Internet to service customer requests for content. While depicted as a single computer, the digital content provider may utilize multiple linked computers to carry out the functions described herein.

Figure 9:
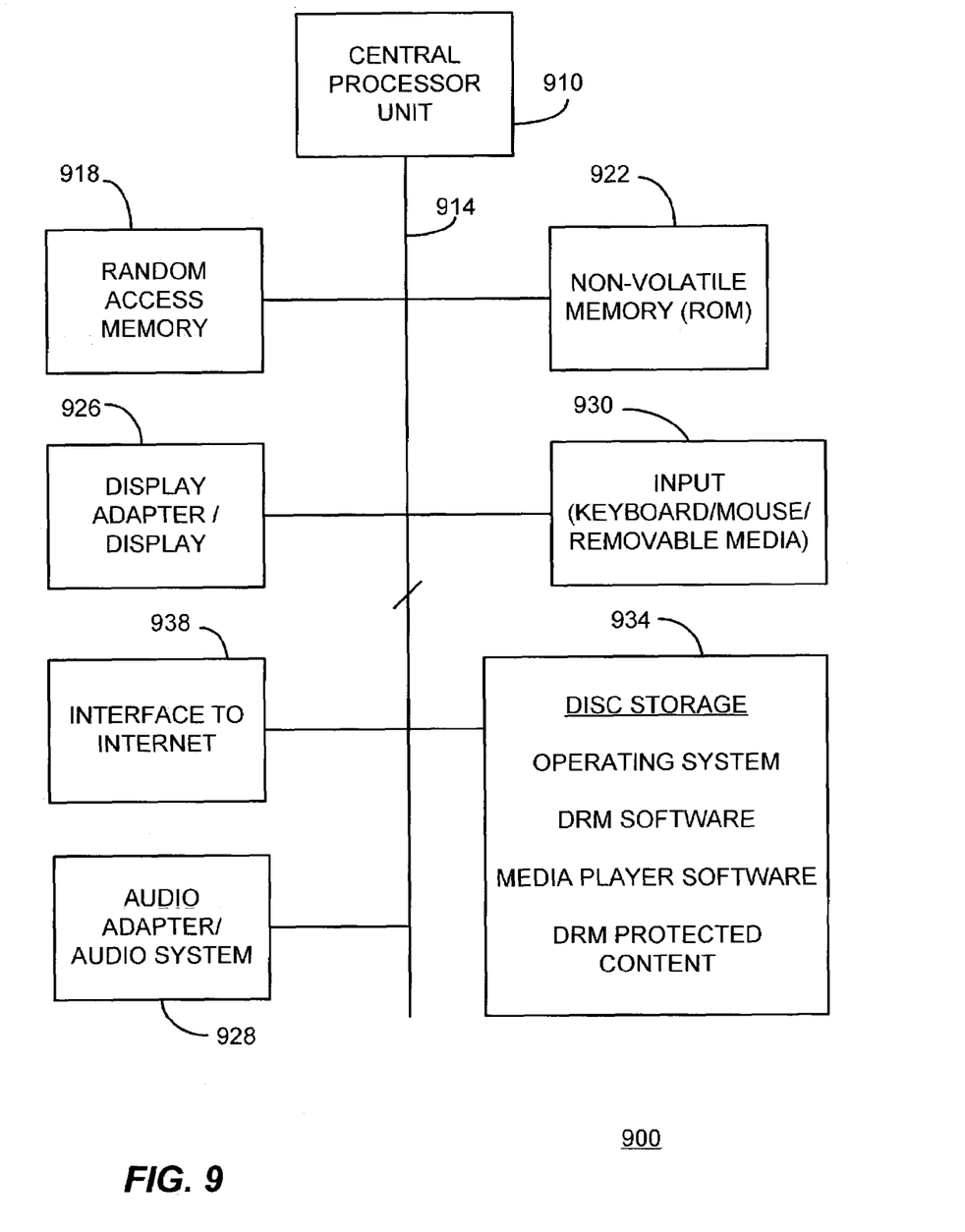
FIG. 9 is a block diagram of a playback computer consistent with embodiments of the present invention.

The process 700 of FIG. 7 can be carried out on any suitable programmed general purpose processor operating as a decoder/decrypter and DRM validator such as that depicted as computer 900 of FIG. 9. Computer 900 may be typical of personal computer devices and has a central processor unit (CPU) 910 with one or more associated buses 914 used to connect the central processor unit 910 to Random Access Memory 918 and Non-Volatile Memory 922 in a known manner. Output devices 926, such as a display adapter and display are provided in order to display output for the use of the customer (possibly including playback of video content) as well as to provide a user interface such as a Graphical User Interface (GUI). An audio adapter and audio system 928 may also be attached for playback of audio or audio/video content. Similarly, input devices such as keyboard, mouse and removable media readers 930 may be provided for the input of information by the operator. Computer 900 also incorporates internal and/or external attached disc or other mass storage 934 for storing large amounts of information including, but not limited to, the operating system, DRM validation and decryption software, media player software as well as the downloaded content. The Computer system 900 also has an interface 938 for connection to the Internet, e.g. to purchase content.

Thus, certain embodiments of the present invention provide for a digital content provider to readily supply content under multiple digital rights management schemes without need to fully encrypt the content for each potential DRM system. This permits a reduction in either storage capacity (for storage or multiple fully encrypted copies of content) or processing power (to encrypt on the fly) needed by the digital content provider. By use of embodiments of the present invention, the customer can be afforded a wide range of content without need to purchase or load multiple DRM systems and media players on his or her personal computer since multiple. DRMs can be readily accommodated by the content provider at low cost.

Those skilled in the art will recognize that the present invention has been described in terms of exemplary embodiments based upon use of a programmed processor (e.g., computers 800 and 900). However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention. Moreover, although the present invention has been described in terms of a general purpose personal computer providing a playback mechanism, the playback can be carried on a dedicated machine without departing from the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of enabling use of multiple digital rights management scenarios (DRM), comprising the following sequence of operations:

examining unencrypted data representing digital content to identify segments of the unencrypted data for encryption;

duplicating the segments of data to produce first and second copies of the identified segments of data;

after duplicating the identified segments of data, encrypting the first copy of the identified segments of data using a first encryption method associated with a first DRM to produce first encrypted segments;

after duplicating the identified segments of content, encrypting the second copy of the identified segments of content using a second encryption method associated with a second DRM to produce second encrypted segments;

generating first pointers that point to locations of the first encrypted segments;

generating second pointers that point to locations of the second encrypted segments; and after producing the first and second encrypted segments, replacing the identified segments of data with both the first encrypted segments and the second encrypted segments in the digital content; and after generating the first and second pointers, inserting both the first and second pointers to produce a partially encrypted dual DRM enabled file, wherein the segments identified for encryption comprise only a portion of the total segments that make up the digital content, and wherein segments that are not identified for encryption remain unencrypted in the partially encrypted dual DRM enabled file.

2. The method according to claim 1, wherein the content comprises digitized audio.

3. The method according to claim 1, wherein the content comprises digitized video.

4. The method according to claim 1, further comprising appending data to enable digital rights under the first DRM to the file.

5. The method according to claim. 1, further comprising appending data to enable digital rights under the second DRM to the file.

6. The method according to claim 1, wherein the first and second pointers comprise byte offsets identifying a starting location for encrypted segments.

7. The method according to claim 1, wherein the first and second encrypted segments have a duration defined by an encryption quanta.

8. The method according to claim 1, further comprising appending data to enable digital rights under at least one of the first DRM and the second DRM to the file; and transmitting the file to a customer.

9. A computer readable medium storing instructions which, when executed on a programmed processor, carry out the method of method of enabling use of multiple digital rights management scenarios according to claim 1.

10. An encoder that enables use of multiple digital rights management scenarios (DRM), comprising:
   means for examining unencrypted data representing digital content to identify segments of the unencrypted data for encryption;
   means for duplicating the segments of data to produce first and second copies of the identified segments of data;
   a first encrypter that encrypts the first copy of the identified segments of data using a first encryption method associated with a first DRM to produce first encrypted segments;
   a second encrypter that encrypts the second copy of the identified segments of
   duplicating the segments of data to produce first and second copies of the identified segments of data;
   using a second encryption method associated with a second DRM to produce second encrypted segments;
   means for generating first pointers that point to locations of the first encrypted segments;
   means for generating second pointers that point to locations of the second encrypted segments; and
   means for replacing the identified segments with both the first encrypted segments and the second encrypted segments in the digital content, and inserting both the first and second pointers to produce a partially encrypted dual DRM enabled file, wherein the segments identified for encryption comprise only a portion of the total segments that make up the digital content, and wherein segments that are not identified for encryption remain unencrypted in the partially encrypted dual DRM enabled file.

11. The encoder according to claim 10, wherein the content comprises at least one of digitized audio and digitized video.

12. The encoder according to claim 10, further comprising means for appending data to enable digital rights under at least one of the first DRM and the second DRM to the file.

13. The encoder according to claim 10, wherein the first and second pointers comprise byte offsets identifying a starting location for encrypted segments of content.

14. The encoder according to claim 10, wherein the first and second encrypted segments of content have a duration defined by an encryption quanta.

15. The encoder according to claim 10, further comprising appending data to enable digital rights under at least one of the first DRM and the second DRM to the file; and transmitting the file to a customer.

16. The encoder according to claim 10, implemented in a programmed general purpose computer.

17. A method of using rights to digital content under one of a plurality of digital rights management scenarios (DRM), comprising:
   carrying out a transaction to acquire digital rights to the digital content;
   after carrying out the transaction, receiving the digital content containing:
      segments of unencrypted data;
      first encrypted segments of selected data encrypted using a first encryption method associated with a first DRM;
      second encrypted segments of said selected data encrypted using a second encryption method associated with a second DRM, whereby the same selected data are separately encrypted using two different encryption methods associated with two different DRMs, and wherein the first and second encrypted segments both represent said selected data when not encrypted;
      first pointers that point to locations of the first encrypted segments of said selected data;
      second pointers that point to locations of the second encrypted segments of said selected data; and
      DRM data that enables digital rights under at least one of the first DRM and the second DRM;
      wherein the first and second pointers comprise bytes offsets identifying a starting location for encrypted segments of said selected data;
   after receiving the digital content, determining that valid digital rights are available from the DRM data; and
   after detecting that valid digital rights are available, decrypting one of the first and second encrypted segments of said selected data to enable playing of the content.

18. The method according to claim 17, wherein the content comprises at least one of digitized audio and digitized video.

19. The method according to claim 17, wherein the first and second encrypted segments of said selected data have a duration defined by an encryption quanta.

20. A computer readable medium storing instructions which, when executed on a programmed processor, carry out the method of using rights to digital content according to claim 17.

21. A decrypter that enables use rights to digital content under one of a plurality of digital rights management scenarios (DRM), comprising:
   means for carrying out a transaction to acquire digital rights to the content;
   means for receiving digital content containing:
      segments of unencrypted data,
      first encrypted segments of selected data encrypted using a first encryption method associated with a first DRM;
      second encrypted segments of said selected data encrypted using a second encryption method associated with a second DRM, whereby the same selected data are separately encrypted using two different encryption methods associated with two different DRMs, and wherein the first and second encrypted segments both represent said selected data when not encrypted;
      first pointers that point to locations of the first encrypted segments of said selected data;
      second pointers that point to locations of the second encrypted segments of said selected data; and
      DRM data that enables digital rights under at least one of the first DRM and the second DRM;
      wherein the first and second pointers comprise bytes offsets identifying a starting location for encrypted segments of said selected data;
   a DRM validator that determines that valid digital rights are available from the DRMdata; and
   a decrypter that decrypts one of the encrypted segments of said selected data to enable playing the content.

22. The decrypter according to claim 21, wherein the content comprises at least one of digitized audio and digitized video.

23. The decrypter according to claim 21, wherein the first and second encrypted segments of said selected data have a duration defined by an encryption quanta.

24. The decrypter according to claim 21, implemented in a programmed general purpose computer.

25. A selectively encrypted digital content signal that enables use of multiple digital rights management scenarios (DRM) embodied as code stored in a storage medium, comprising:
   segments of unencrypted data;
   first encrypted segments of selected data encrypted using a first encryption method associated with a first DRM;
   second encrypted segments of said selected data encrypted using a second encryption method associated with a second DRM, whereby the same selected data are separately encrypted using two different encryption methods associated with two different DRMS, and wherein the first and second encrypted segments both represent said selected data when not encrypted;
   a first segment of code comprising first pointers that point to locations of the first encrypted segments of said selected data;
   a second segment of code comprising second pointers that point to locations of the second encrypted segments of said selected data;
   wherein the first and second pointers comprise bytes offsets identifying a starting location for encrypted segments of said selected data; and
   a segment of DRM data that enables digital right under at least one of the first DRM and the second DRM.

26. The carrier wave according to claim 25, wherein the content comprises at least one of digitized audio and digitized video.

27. The carrier wave according to claim 25, wherein the first and second encrypted segments of said selected data have a duration defined by an encryption quanta.

28. A selectively encrypted digital content signal that enables use of multiple digital rights management scenarios (DRM) embodied in a computer readable medium, comprising:
   segments of unencrypted data;
   first encrypted segments of selected data encrypted using a first encryption method associated with a first DRM;
   second encrypted segments of said selected data encrypted using a second encryption method associated with a second DRM, whereby the same selected data are separately encrypted using two different encryption methods associated with two different DRMs, and wherein the first and second encrypted segments both represent said selected data when not encrypted;
   a first segment of code comprising first pointers that point to locations of the first encrypted segments of said selected data;
   wherein the first and second pointers comprise bytes offsets identifying a starting location for encrypted segments of said selected data; and
   a second segment of code comprising second pointers that point to locations of the second encrypted segments of said selected data;
   a segment of DRM data that enables digital rights under at least one of the first DRM and the second DRM.

29. The computer readable medium according to claim 28, wherein the content comprises at least one of digitized audio and digitized video.

30. The computer readable medium according to claim 28, wherein the first and second encrypted segments of said selected data have a duration defined by an encryption quanta.

31. A method of enabling use of multiple digital rights management (DRM) systems, comprising the following sequence of operations:
   examining unencrypted data representing digital content to identify segments of selected the unencrypted data for encryption;
   after identifying the segments of said selected data, encrypting the identified segments of said selected data using a first encryption method associated with a first DRM to produce first encrypted segments;
   after identifying the segments of said selected data, encrypting the identified segments of said selected data using a second encryption method associated with a second DRM to produce second encrypted segments;
   whereby the same selected data are separately encrypted using two different encryption methods associated with two different DRMs, and wherein the first and second encrypted segments both represent said selected data when not encrypted; and
   after producing the first and second encrypted segments, replacing the identified segments of said selected data with both the first encrypted segments and the second encrypted segments in the digital content, wherein the segments identified for encryption comprise only a portion of the total segments that make up the digital content, and wherein segments that are not identified for encryption remain unencrypted.

32. The method according to claim 31, wherein the content comprises at least one of digitized audio and digitized video.

33. The method according to claim 31, wherein the content comprises digitized video.

34. The method according to claim 31, further comprising appending data to enable digital rights under at least one of the first DRM and the second DRM to the file.

35. The method according to claim 31, wherein the first and second encrypted segments have a duration defined by an encryption quanta.

36. The method according to claim 31, further comprising appending data to enable digital rights under at least one of the first DRM and the second DRM to the file; and transmitting the file to a customer.

37. A computer readable medium storing instructions which, when executed on a programmed processor, carry out the method of method of enabling use of multiple digital rights management scenarios according to claim 31.

38. A computer readable medium storing the multiple selectively DRM encrypted file generated according to the method of claim 31.

* * * * *